April 25, 1967 W. S. ANDERSON 3,315,788
FLIGHT AND IDLER ROLLER CONSTRUCTION FOR ENDLESS BELT
Filed Oct. 20, 1965 2 Sheets-Sheet 2
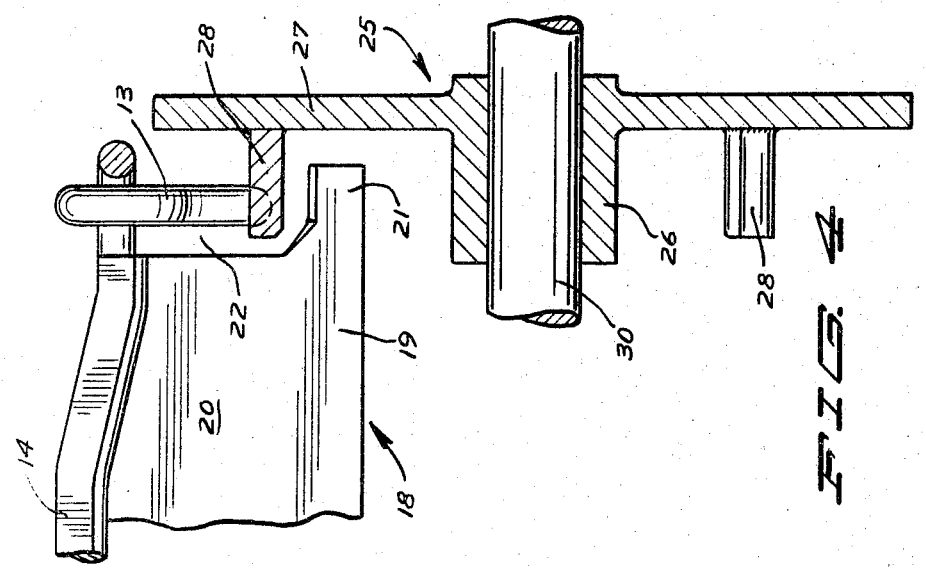
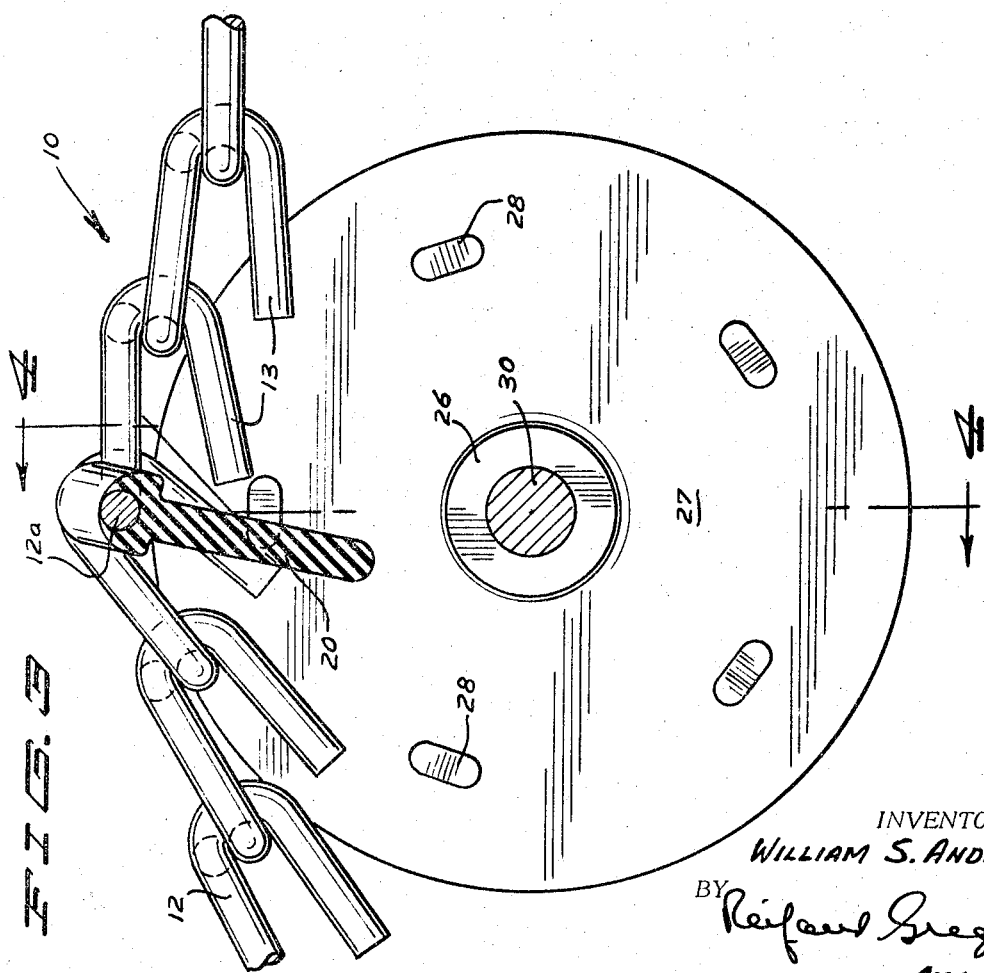
INVENTOR.
WILLIAM S. ANDERSON
BY
ATTORNEYS

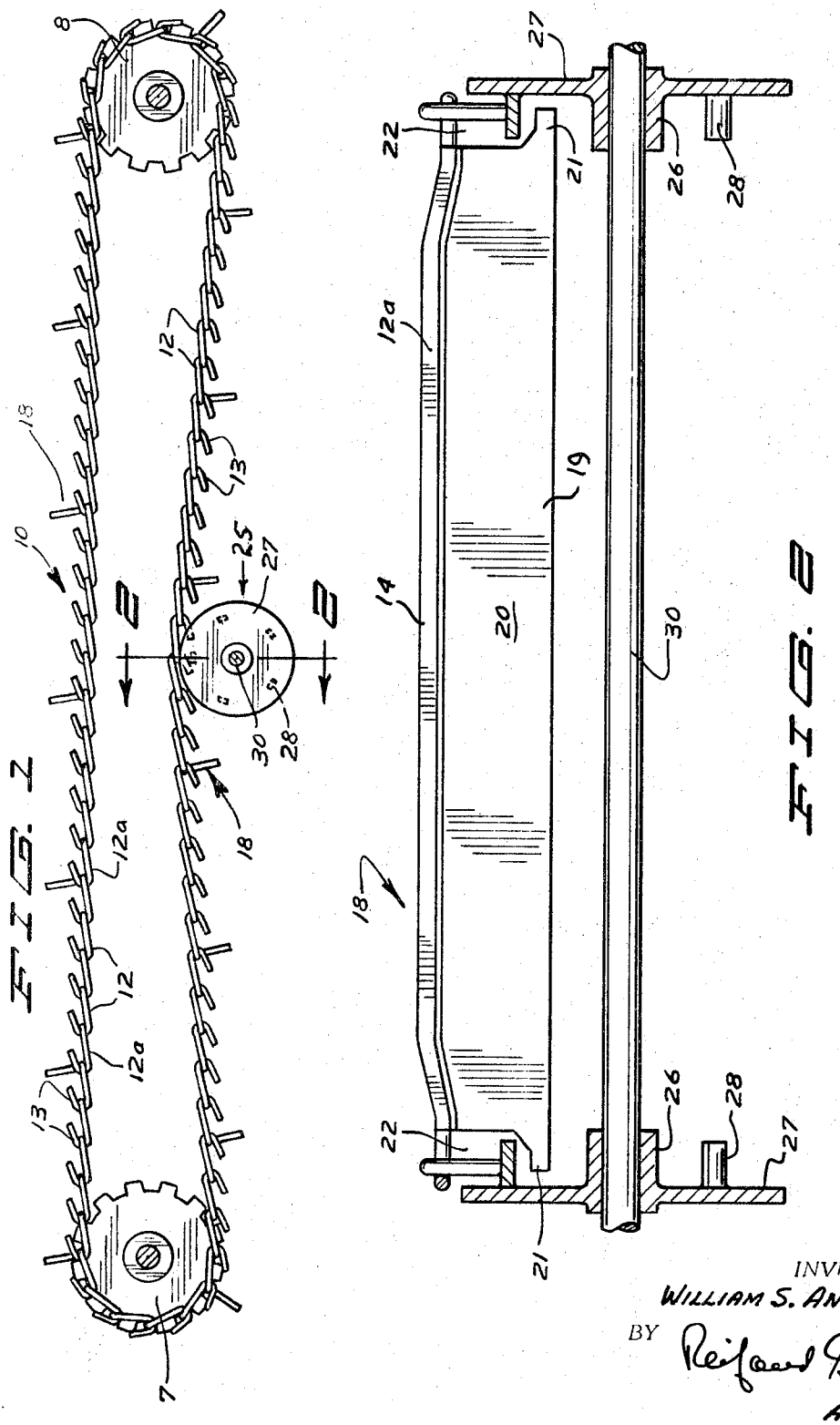

3,315,788
FLIGHT AND IDLER ROLLER CONSTRUCTION FOR ENDLESS BELT
William S. Anderson, Braham, Minn., assignor to Braco, Inc., Braham, Minn., a corporation of Minnesota
Filed Oct. 20, 1965, Ser. No. 498,768
3 Claims. (Cl. 198—137)

This invention relates to improvement in the structure of an endless conveyor belt and in the supporting structure for the lower run of said belt. Reference is had to the type of conveyor belt having a load bearing surface or body portion such as may be used with a potato harvester for elevating and carrying potatoes.

It is desirable to have such a belt which has flights thereon which extend the full width of the belt. Flights on conveyor belts are commonly of a length less than the full width of the belt due to obstruction encountered in connection with the supporting means commonly used for the return or lower run of the belt. Conventional supporting means for the return run of an endless belt such as idler rollers or rails, extend inwardly of either side of the belt and would provide obstruction for the passage of the end portions of a flight extending the full width of the belt. The end portions as a result of hitting and flexing in passing the obstruction would soon weaken sufficiently to break off.

It is an object of this invention to provide an endless conveyor belt having flights thereon extending the full width of the belt, said flights being particularly arranged to have unobstructed passage throughout the return or lower run of the belt.

It is another object of this invention to provide supporting means for the return run of an endless conveyor, said means being particularly arranged and constructed to permit the unobstructed passage thereby of full belt width flights carried on said belt.

It is more specifically an object of this invention to provide full conveyor belt width flights to utilize the full width of the belt for work load capacity, thus permitting the use of a narrower belt than one having a conventional type flight of substantially lesser width than full belt width.

These and other objects and advantages of the invention will be set forth in the following description made in connection with the accompanying drawings in which like reference characters refer to similar parts throughout the several views and in which:

FIG. 1 is a view in side elevation and partially in section showing a general application of the specific structure disclosed herein;

FIG. 2 is a broken view in vertical section on an enlarged scale taken on line 2—2 of FIG. 1 as indicated;

FIG. 3 is a broken view in vertical section showing a detail of structure on an enlarged scale; and FIG. 4 is a broken view in vertical section taken on line 4—4 of FIG. 3 as indicated.

With reference to the drawings, FIG. 1 is provided to illustrate a general application of the specific structure disclosed and claimed herein. An endless conveyor belt 10 embodying the structure herein is shown passing over sprocket wheels 7 and 8 and having its lower run supported by the roller 25 which will be hereinafter described.

Said belt 10 comprises rod-like links 12 having conventional reversely bent interengaging end portions 13 forming the load carrying body portion of said belt. Said links are formed having offset or dodged central portions 14.

Certain of said links which are indicated by the character 12a are provided with flights. All of the flights are identical in structure and flight 18 is representative of these. Said flight is shown molded onto said link 12a to be rigid therewith, and may be formed of a suitable rubber material of such durometer as to be upstanding from said link and to have sufficient rigidity for support of goods carried on said belt. The forming and molding of said flight forms no part of the invention herein.

Said flight may take on various forms in cross section. The general configuration of the end portions of said flight 18 represents novel structure herein. Said flight is so constructed as to have effective utility or working capacity substantially the full width of the belt.

The free or outer edge portions 19 of said flight has a length extending substantially the full width of said belt 10.

The body portion 20 of said flight extending in width from said free edge portion 19 to said link 12a has a reduced length relative to that of said portion 19 and is thus less in length than the width of said belt 10. Said portion 19 thus is formed having extended end portions 21 at either end thereof with regard to said body portion 20, and said extended ends in connection with said body portion 20 form recessed areas 22 at either end of said flight. Said extended end portions 21 will be of sufficient width, thickness and strength to have substantial work capacity. Said recessed areas 22 will be of such size as not to permit the passage therethrough of the goods carried on said belt. It will be understood that said extended end portions may take on various specific configurations.

Attention here is centered on said flight 18 in connection with the return or lower run of the belt 10. The upper run of said belt will be supported and driven in a conventional manner as by said sprocket wheels 7 and 8 which will be supported and driven in a conventional manner.

Supporting the lower or return run of said belt 10 are rollers of which roller 25 is representative. Said rollers will be disposed in transversely or axially aligned pairs positioned adjacent either outer side edge of the lower run of said belt.

Said roller in a preferred form is shown comprising a hub 26 which will be supported on a shaft 30 which in turn will be suitably mounted on a supporting structure in a conventional manner. Integral with said hub 26 is a web 27 shown as platelike and circular in form.

Integral with said web and extending outwardly of one side thereof to underlie the adjacent edge portion of the lower run of said belt 10 to support the same are relatively short length pins or rods 28. For purpose of illustration, said pins or rods are shown as being elliptical in cross section, but it will be understood that said pins or rods may take on various cross sectional forms in keeping with the specific configuration of said extended end portions 21.

Said pins are disposed on said web 27 to define a circular spaced relation. The pins will be spaced sufficiently apart and a sufficient distance from the center of said web to allow the unobstructed passage therebetween of said extended end portions 21. In operation, said extended end portions will pass under the conveyor supporting pin and between adjacent of said pins.

Said pins 28 will have a length such as to permit the unobstructed passage thereby of the body portions 20 of said flights, or in other words said pins will be within said end recessed areas 22 as said flights pass by.

Thus said pins 28 will be of sufficient number to suitably support the lower run of said belt, of such spacing to permit the unobstructed passage thereby of the full belt width portions of said flights and of such length as to permit the unobstructed passage of the reduced width body portions of said flights.

The operation of the structure described would appear to be quite obvious from the description thereof. The number of pairs of rollers to be used will depend upon the length of the conveyor belt as to what will be required for suitable support of the lower run.

The recessed areas 22 at either end of the flights are not of such size as to allow goods to pass therethrough. The structure herein provides an effective carrying or moving means for the full width of the belt and thus permits use of the conveyor belt throughout the extent of its full width. It will be appreciated that the utilization of the full width of a conveyor belt will permit the use of a narrower belt for a given amount of work to be done or provides greater carrying capacity than would otherwise be possible.

Thus it is seen that I have provided a simple and efficient structure to permit the use of the full width of a conveyor belt having a load bearing surface or body portions.

It will of course be understood that various changes may be made in the form, details, arrangement and proportions of the parts, without departing from the scope of applicant's invention which, generally stated, consists in an apparatus capable of carrying out the objects above set forth, in the parts and combinations of parts disclosed and defined in the appended claims.

What is claimed is:

1. An endless conveyor belt of the character indicated and lower run supporting structure for the same having in combination,
   interengaged transversely spaced links,
   a plurality ef flights integral with and upstanding from certain of said links,
   each of said flights having an outer edge portion extending substantially the full width of said belt and having a remaining body portion of a reduced width being less than the width of said belt,
   a pair of rollers spaced apart somewhat more than the width of said belt to support the lower run of said belt, each of said rollers comprising
      a hub, a web integral with said hub,
      a plurality of pins in circular spaced relation integral with said web and at right angles thereto extending to one side thereof to underlie said belt, said pins being of a length to underlie and support the adjacent edge portions of said belt and to avoid engagement with said body portion of reduced width, and
      said pins on each of said webs being spaced apart sufficiently to allow the unobstructed passage therebetween of the extended portions of said flight providing said flight with a width the full width of said belt.

2. An endless conveyor belt having in combination,
   means supporting the lower run of said belt, said means comprising
      a hub, a web integral with said hub, and
      a plurality of pins integral with said web and extending to one side thereof to underlie and support the adjacent edge portion of said belt, said pins being disposed to define a circular spaced relation.

3. An endless conveyor belt comprising
   load supporting means,
   a plurality of flights upstanding from said means in spaced relation about said belt,
   each of said flights comprising a portion remote from said means of substantially the full width of said belt, and having a remaining portion adjacent said means of lesser width than the width of said belt,
   transversely spaced rollers supporting the lower run of said belt,
   each of said rollers comprising
      a hub, a web integral with said hub,
      a plurality of pins integral with said web and extending outwardly of one side thereof to underlie and support an edge portion of said belt, and
      said pins having a length to allow the unobstructed passage of the body portions of said flights of lesser width and being spaced sufficiently apart on each of said webs to permit the unobstructed passage therebetween of said body portions of said flights having a width substantially the full width of said belt.

References Cited by the Examiner

UNITED STATES PATENTS 2,783,890  3/1957  Harlan _____ 198—174 X

FOREIGN PATENTS 568,049  3/1956  Canada.

EVON C. BLUNK, *Primary Examiner.*

EDWARD A. SROKA, *Examiner.*